United States Patent [19]

Putman

[11] Patent Number: 4,513,240
[45] Date of Patent: Apr. 23, 1985

[54] METHOD AND APPARATUS FOR SELECTIVE CANCELLATION OF SUBSYNCHRONOUS RESONANCE

[75] Inventor: Thomas H. Putman, Penn Hills, Pa.

[73] Assignee: Westinghouse Electric Corp., Pittsburgh, Pa.

[21] Appl. No.: 502,374

[22] Filed: Jun. 8, 1983

[51] Int. Cl.$^3$ .............................................. G05F 1/70
[52] U.S. Cl. ..................................... 323/210; 363/39; 363/64
[58] Field of Search ............................ 323/208–211, 323/361; 363/39, 64

[56] References Cited

U.S. PATENT DOCUMENTS

| | | | |
|---|---|---|---|
| 3,648,149 | 3/1972 | Brown et al. | 363/64 X |
| 4,028,614 | 6/1977 | Kelley, Jr. | 323/210 |
| 4,071,885 | 1/1978 | Bilczo et al. | 363/64 |
| 4,437,052 | 3/1984 | Gyugyi | 323/210 |
| 4,451,777 | 5/1984 | Gyugyi | 323/210 |

FOREIGN PATENT DOCUMENTS

| | | | |
|---|---|---|---|
| 0499595 | 7/1976 | U.S.S.R. | 323/210 |
| 0964850 | 10/1982 | U.S.S.R. | 323/210 |

Primary Examiner—Peter S. Wong
Attorney, Agent, or Firm—John Victor Pezdek

[57] ABSTRACT

Apparatus and process for the selective cancellation of harmonic frequencies of current produced in a multiphase dynamic stabilizer. A plurality of multiphase dynamic stabilizers providing electrical stabilization are interconnected to a multiphase AC electrical network via a coupling transformer. The leakage reactances and turns ratios of the windings of the transformer are such that the phases of selected harmonic frequencies of current produced in each of the stabilizer means are rotated with respect to those of the other stabilizer means with the selected harmonic frequencies being substantially cancelled in each of the stabilizer means. The harmonics are not the cause of subsynchronous resonance. The cancelled harmonic frequencies are dependent upon the number of dynamic stabilizers used. Where a dual stabilizer system is utilized, the coupling transformer is forked wye transformer having the primary windings connected in delta with the principal secondary windings connected in wye and each principal secondary winding having two auxiliary secondary windings connected thereto. By forming the auxiliary secondary windings such that the ratio of the number of turns therein with respect to the principal secondary winding is about the $$\frac{\sqrt{3}-1}{2} \pm 0.1\%,$$

and the leakage reactance of the principal secondary winding being equal to about twice the common leakage reactance of the auxiliary secondary windings, the phases of the harmonic currents produced in each stabilizer rotates by approximately 30 electrical degrees with respect to one another leading to the substantial cancellation of harmonic currents of each stabilizer characterized by the series 5, 7, 17, 19 . . . n, p where n=5+z; p=7+z; and z=multiples of 12. Addition of shunt capacitors across each of the primary windings creates a static VAR generator having the same harmonic current cancellation attribute.

18 Claims, 6 Drawing Figures

METHOD AND APPARATUS FOR SELECTIVE CANCELLATION OF SUBSYNCHRONOUS RESONANCE

CROSS REFERENCE TO RELATED APPLICATION

This application is related to copending application Ser. No. 502,379, filed June 8, 1983, entitled "Core Form Transformer for Selective Cancellation of Subsynchronous Resonance".

BACKGROUND OF THE INVENTION

1. Field of the Invention:

The present invention relates to the area of reactive power (VAR) compensation and in particular the use of dynamic stabilizers and a coupling transformer to provide stabilization to AC electrical generators or turbine generators against resonance.

2. Description of the Prior Art:

Maximizing the operational reliability and efficiency of large electrical systems frequently requires the use of reactive power (VAR) compensation. For example, industrial users commonly employ shunt capacitors, switched by conventional means, to provide the reactive power required by their load. Because use of the capacitors results in improved load power factor and load bus voltage support, significant rate savings and improvements in production process efficiency are generally realized. In a like manner, transmission engineers have applied series capacitors and switched shunt reactors and capacitors to high voltage transmission lines for purposes of increasing transmission capacity and transient stability margins, providing voltage support, and limiting steady-state and transient overvoltages.

A major problem in the application of series connected capacitor compensated transmission lines is the occurrence of subsynchronous resonance. In subsynchronous resonance, the transmission line and series capacitor exhibit series resonance at a frequency below the system frequency which is typically 60 Hz. Disturbances or faults can easily excite low frequency resonant currents. These low frequency resonant currents can affect the turbine generator sets supplying the electrical transmission line. A mechanical resonance between the generator rotor, turbine rotor and the shaft connecting the generator and turbine can be excited by these low frequency resonant currents and will continue to grow indefinitely once started. If permitted to continue, subsynchronous resonance is destructive to the machinery.

One method for controlling subsynchronous resonance is to apply a reactive load periodically to the terminals of the generator. Reactors are switched on and off by means of reverse parallel thyristor pairs. However, while this circuit arrangement provides compensation to the transmission line and generator, it can also cause undesirable odd harmonic currents to flow to the generator proportional to the size of the reactor being controlled. At times, the conduction angle of the thyristor switches is reduced to decrease the reactive current flow to the generator, a condition which accentuates the odd harmonic currents found in the stabilizer.

By arranging the thyristor controlled reactors in a delta configuration the triple odd harmonic currents, e.g. 3rd, 9th, 15th, can be substantially cancelled under balanced three phase operation. However, the other harmonic currents do not cancel. Thus, another means for providing cancellation of the odd harmonic currents other than the triple odd harmonic currents would be desirable.

In most electrical systems which utilize dynamic stabilizers, the stabilizer is ordinarily connected to the generator through a multiphase coupling transformer in order to provide a suitable operating voltage level for the thyristors and associated reactors. Theoretically, the transformer which is used to interconnect the stabilizer with the generator should cause the selective cancellation of certain odd harmonic frequencies generated by the phase angle firing of the thyristors in the stabilizers. Unfortunately, the leakage reactances of the transformer tend to prevent this cancellation particularly when the reactance is a sizable percentage of the effective reactance of the dynamic stabilizers. Because of the duty cycle of the stabilizer (i.e. the short periods of time during which the stabilizer is fully on), the volt ampere rating of the transformer can be considerably less than the full-on volt ampere rating of the stabilizer. For instance, the volt amperes required may be as low as 20% of the full-on volt amperes. As a result, a situation occurs where the transformer leakage reactance adds significantly to the reactance of the stabilizer when the thyristors are conducting. Thus, it would be desirable to have an apparatus and method for producing the apparatus which overcomes the effects of the leakage reactance of the transformer and restores the selective cancellation of the harmonic frequencies of currents that occur in the dynamic stabilizers.

SUMMARY OF THE INVENTION

The present invention is an apparatus and method for the substantial cancellation of selective odd harmonic frequencies of current that occur in a multiphase dynamic stabilizer which is connected to a multiphase AC electrical system. A plurality of multiphase dynamic stabilizers are electrically coupled to an electrical system, e.g., a transmission line, via a transformer. The dynamic stabilizers may also be used to provide VAR compensation for the electrical network. A firing angle regulator produces a control signal for operating the dynamic stabilizers to supply the required stabilization to the electrical system. The transformer rotates the phase of selected harmonic currents produced in each of the stabilizer means with respect to those of the other stabilizer means such that the selected harmonic frequencies produced by the various stabilizer means substantially cancel. By controlling the ratios of the leakage reactances of the transformer and the turns ratios of the windings thereof, the deleterious effects of the leakage reactance can be overcome allowing for the substantial cancellation of the selected harmonics of current such as could be obtained with ideal transformers without leakage reactance. In an alternate embodiment, capacitors can be installed on the primary side of the transformer. The addition of the capacitors forms a simplified static VAR generator which has the benefit of having cancellation of selected harmonic currents.

BRIEF DESCRIPTION OF THE DRAWINGS

For a better understanding of the invention reference may be made to the preferred embodiments exemplary of the invention shown in the accompanying drawings.

DESCRIPTION OF THE PREFERRED EMBODIMENTS

Figure 1:
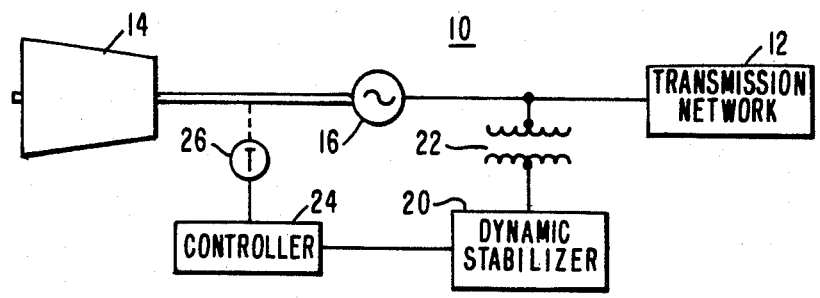
FIG. 1 is a simplified schematic representation of an electrical system utilizing the present invention.

Shown in FIG. 1 is an electromechanical network 10 consisting of a transmission network 12, turbine 14 and generator 16. The electrical network 10 is a multiphase alternating current (AC) system preferably having three phases. A dynamic stabilizer 20 is interconnected to the network 10 via a coupling transformer 22. Because the system voltage of the electrical network is typically much greater than that desired for operation of the dynamic stabilizer 20, the coupling transformer 22 acts to step down the system operating voltage to a suitable operating voltage level for the components associated with the stabilizer 20. The transformer 22 also performs other functions described hereinafter.

A controller 24 is provided to control the compensation provided by the dynamic stabilizer 20. The controller 24 senses the speed of the rotor of the generator 16 via a speed sensor such as a tachometer 26 to determine the stabilization required by the generator 16 and in accordance with these requirements generates a control signal which adjusts the conduction angle firing of thyristors in the stabilizer 20 to establish the necessary reactive currents to be supplied as compensation to the generator 16.

While the dynamic stabilizers 20 and transformer 22 are shown connected to the illustrated electrical network 10, it should be realized that the particular form of the electrical network is not critical to the operation of the present invention. The dynamic stabilizer and associated coupling transformer can provide selective cancellation of harmonic currents when interconnected to other forms of electrical networks. Because the majority of applications for the present invention would be with three phase electrical networks, the various embodiments of the invention discussed hereinafter will be for three phase electrical networks. The three electrical phases are identified by the letters a, b, and c and have substantially balanced AC voltages and AC currents which are displaced by about 120 electrical degrees (($2\pi/3$) radians) with respect to each other. The windings of the coupling transformer which are associated with a particular electrical phase are marked with the identifier for that phase. In addition, the use of the terms "phase" and "degree(s)" means "electrical phase" and "electrical degree(s)", respectively.

DUAL DYNAMIC STABILIZER CONFIGURATION

Figure 2:
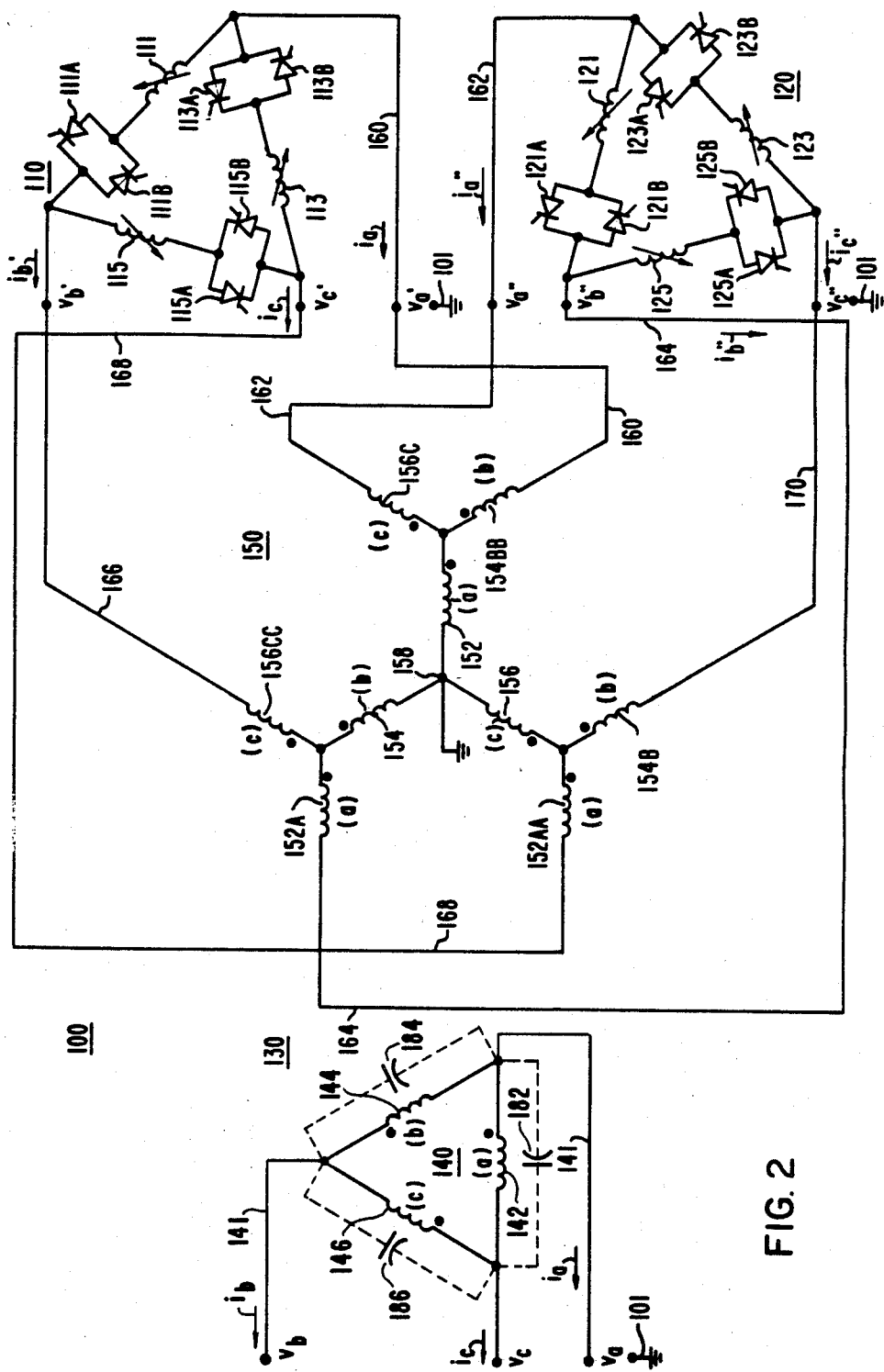
FIG. 2 is a schematic representation of an embodiment of the present invention utilizing dual dynamic stabilizer and a coupling transformer.

Referring to FIG. 2, the general configuration for a dual dynamic stabilizer system 100 is illustrated. The system 100 comprises two dynamic stabilizers 110 and 120 and a coupling transformer 130. The transformer 130 has a primary side 140 and a secondary side 150, each side having a plurality of multiturn windings. The primary windings 142, 144 and 146 are electrically connected in a delta configuration and have the terminal voltages $v_a$, $v_b$ and $v_c$ with respect to ground 101. The primary side 140 is electrically connected to a generator (not shown) by the conductors 141, 143, and 145 which are electrically connected to the corners of the delta-connected primary windings. The currents $i_a$, $i_b$ and $i_c$ are supplied from the system 100 for stabilization of the electrical system.

The secondary side 150 of the transformer 130 consists of two groups of multiturn windings—principal secondary windings 152, 154, and 156 and the corresponding auxiliary secondary windings 152A, 152AA, 154B, 154BB, 156C, and 156CC. The two auxiliary windings for each principal secondary windings, for example windings 152A and 152AA for winding 152 are also known as stub, tertiary, or zig-zag windings and in the transformer are wound about the same magnetic leg or core as their associated principal secondary winding. Further, each auxiliary winding pair 152A and 152AA, 154B and 154BB, 156C and 156CC is wound adjacent one another in order to maximize magnetic coupling therebetween. These pairs are also known as bifilar windings.

The principal secondary windings 152, 154 and 156 are electrically connected in a wye configuration with the common connection 158 being electrically connected to ground 101. Electrically attached to each principal secondary winding are two auxiliary secondary windings with each electrically connected combination of principal secondary and two auxiliary secondary windings having like or matching polarities as indicated by the polarity markings shown in FIG. 2. The two attached auxiliary secondary windings are chosen such that in each of the combinations of windings all three electrical phases are present. In FIG. 2, principal secondary windings 152, 154 and 156 are associated with phases a, b and c, respectively. Accordingly, an auxiliary secondary winding associated with phase b—154BB—and one associated with phase c—156C—would be electrically attached to principal secondary winding 152; similarly for principal secondary windings 154 and 156. Each auxiliary secondary winding is in turn electrically connected to an individual phase of one of the two dynamic stabilizers. The connection arrangement of the secondary windings, principal and auxiliary, and the stabilizers is such that corresponding phases of each stabilizer and principal secondary winding are the same. For stabilizer 110 the three phases are labelled a', b' and c'; those for stabilizer 120 are a", b" and c". Thus, principal secondary winding 152 which is of phase a is electrically connected to the phases a' and a" of stabilizers 110 and 120, respectively, via auxiliary windings 154BB and 156C, respectively and conductors 160 and 162, respectively.

For principal secondary winding 154 and phases b' and b" of stabilizers 110 and 120, respectively, the connections are made via auxiliary secondary windings 156CC and 152A, respectively, and conductors 166 and 164, respectively. Similarly, for principal secondary winding 156 and phases c' and c" of the stabilizers 110 and 120, respectively, the connections are made via auxiliary secondary windings 152AA and 154B, respectively, and conductors 168 and 170, respectively.

The voltage and currents for stabilizer 110 are $v_a'$, $v_b'$ and $v_c'$ and $i_a'$, $i_b'$ and $i_c'$ and those for stabilizer 120 are $v_a''$, $v_b''$, and $v_c''$ and $i_a''$, $i_b''$, $i_c''$. These are also referred to as single prime or double prime voltages and currents. These voltages measured are with respect to ground 101 and the current flow is as shown by the arrows. The stabilizers 110 and 120 are substantially identical. Each comprises a plurality of variable reactances electrically connected in delta. For stabilizer 110, there are variable reactances 111, 113 and 115, while for stabilizer 120 these are 121, 123 and 125. The thyristor pairs, 111A and B, 113A and B, 115A and B, 121A and B, 123A and B, and 125A and B, which are connected in series with their respective reactances, are used to control the reactive currents thus creating a variable reactance. The thyristor pairs are connected in a reverse parallel manner. This allows current control during both the negative and positive portions of the system voltages.

During operation, a tachometer is used to sense the mechanical resonant oscillating speed of the rotor of the generator which is superimposed upon the normal operating speed of the rotor. Typically, the normal operating speed of the rotor is 3600 rpm whereas the oscillating speed may be about 25 Hz. The signal representing the speed of 3600 rpm is filtered out by conventional signal conditioning means leaving a signal having the mechanical frequency of the subsynchronous resonance at the rotor. This conditioned rotor speed signal controls the conduction angle of the thyristor pairs of the stabilizers acting to increase or decrease the value of the reactances. As rotor speed decreases, the conduction angle increases, increasing the reactive power to the stabilizer and making the stabilizers appear to have decreased in reactance. As rotor speed increases, the conduction angle of the thyristor pairs decreases, decreasing the reactive power to the stabilizer and making the stabilizers appear to have increased in reactance.

The mechanical subsynchronous frequency is related to the frequency of the subresonant currents in the electrical portion of the system in that it is essentially the difference between the normal operating frequency of the system and the frequency of the subsynchronous resonant currents found therein. For example, where a typical system frequency is 60 Hz and a typical value for the frequency of subsynchronous resonant currents circulating in the system is 40 Hz, the expected mechanical frequency of oscillation would be 60 Hz−40 Hz or 20 Hz.

Figure 3:
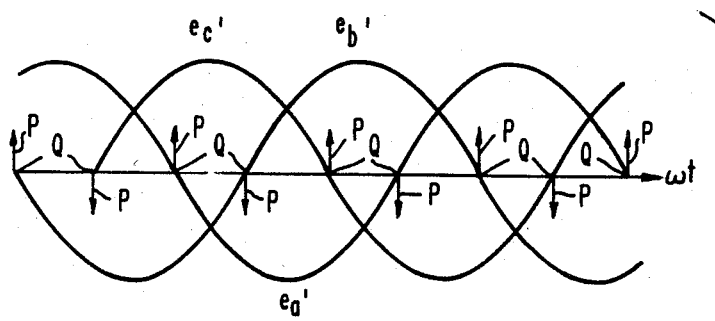
FIG. 3 is an illustration of the voltage wave forms across the thyristor-controlled reactors illustrated in FIG. 2.
Figure 3:
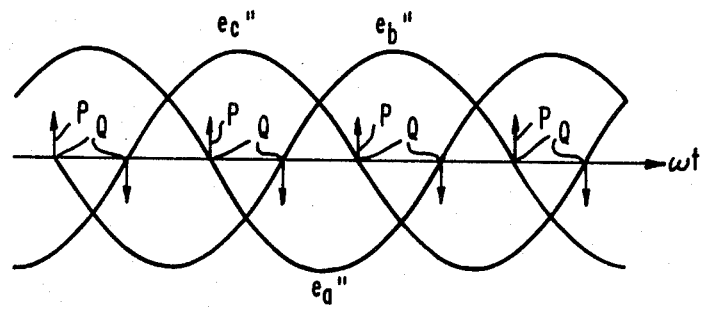

FIG. 3 illustrates the relationship of the current and voltages of the variable reactors in each of the stabilizers 110 and 120. The sinusoidal waves $e_a'$, $e_b'$, $e_c'$, $e_a''$, $e_b''$ and $e_c''$ are the voltages across their respective reactances. For stabilizer 110

$$e_a' = v_b' - v_c' \tag{1}$$

$$e_b' = v_c' - v_a' \tag{2}$$

$$e_c' = v_a' - v_b' \tag{3}$$

The double prime voltages are found in a similar fashion. The arrows represent current pulses P. For each complete cycle, 6 current pulses are produced in each stabilizer or a total of 12 current pulses for both. As a result, this stabilizer arrangement is also referred to as a 12 pulse system. If the thyristors in each stabilizer are fired in the conventional manner so that all reactors have the same conduction or phase angle, then a current pulse P will occur which corresponds to each voltage zero crossing, point Q, with the current pulse P being exactly symmetrical with the zero crossing point Q.

The current pulses P produce harmonic currents. Because of the symmetry of the current pulses, P, they contain no even harmonics and the odd harmonics which are multiples of 3 will circulate within the delta connected reactances of each stabilizer. The odd harmonic currents produced are described by the series 1, 5, 7, 11, 13, 17, 19 ... n where n is an odd integer not divisible by 3. The harmonic frequencies corresponding to n=1, 7, 13, 19 ... (add 6 each time) produce balanced polyphase currents having the phase rotation a, b, c while those frequencies corresponding to n=5, 11, 17 ... (add 6 each time) produce balanced polyphase currents having the phase rotation a, c, b. Under the principles of symmetrical electrical components, these two sets of currents are termed positive sequence currents and negative sequence currents respectively. Also, as can be appreciated by those knowledgeable in this area, no zero sequence harmonic currents are supplied to the generator due to the thyristor control.

In determining the effectiveness of the transformer 130 in cancelling unwanted harmonic currents produced in the stabilizer, the situation is first analyzed from the viewpoint of an ideal transformer. In stabilizer 110 the voltages and currents for the three phases a', b', and c' are displaced 120 degrees; similarly, for the voltages and currents of phases a'', b'', and c'' of stabilizer 120. The geometry of the waveform suggests that cancellation of selected harmonic currents will occur if there is a phase shift of 30 degrees between the voltage of phases a', b', and c' of stabilizer 110 and phases a'', b'', and c'' of stabilizer 120. This phase shift is controlled by the turns ratios between the auxiliary secondary windings and the principal secondary windings and by the polarities of the transformer windings.

The primary delta connected windings have a number of turns equal to q times those of the principal secondary windings. For equal primary winding input voltages and secondary winding output voltages, the theoretical value for q is $$3/\sqrt{2}.$$

The number of turns on the auxiliary secondary windings should be k times the number of turns on the principal secondary windings. For k the theorectical value is $$(\sqrt{3} - 1)/2.$$

In practice the actual values for q and k can be within ±0.1% of their theoretical values. For the polarities of the transformer windings as indicated in FIG. 2, the single prime voltages lead the double prime voltages by 30 degrees. With respect to the voltages of the principal secondary windings, the single prime voltages lag them by about 15 degrees while the double prime voltages lead them by about the same amount. It is not necessary that the single prime voltages lag and the double prime voltage lead, the reverse can also be employed provided the polarities of the transformer windings are also appropriately reversed.

With the values given for q and k, the amplitude of the sinusoidal voltages $v_a$ $v_b$ and $v_c$ of the primary windings 142, 144 and 146, respectively, and the single and double prime voltages are assumed to be equal, i.e., a one-to-one overall voltage transformation. If this is not the case, a scaling factor is included in the value given for q to account for the amplitude difference between the primary voltage and secondary voltage. For example, if q=

$$n(3/\sqrt{2}\,),$$

the primary voltages would be n times the secondary output voltages. Further, these values of q and k are also valid for a transformer having leakage reactance.

Figure 4:
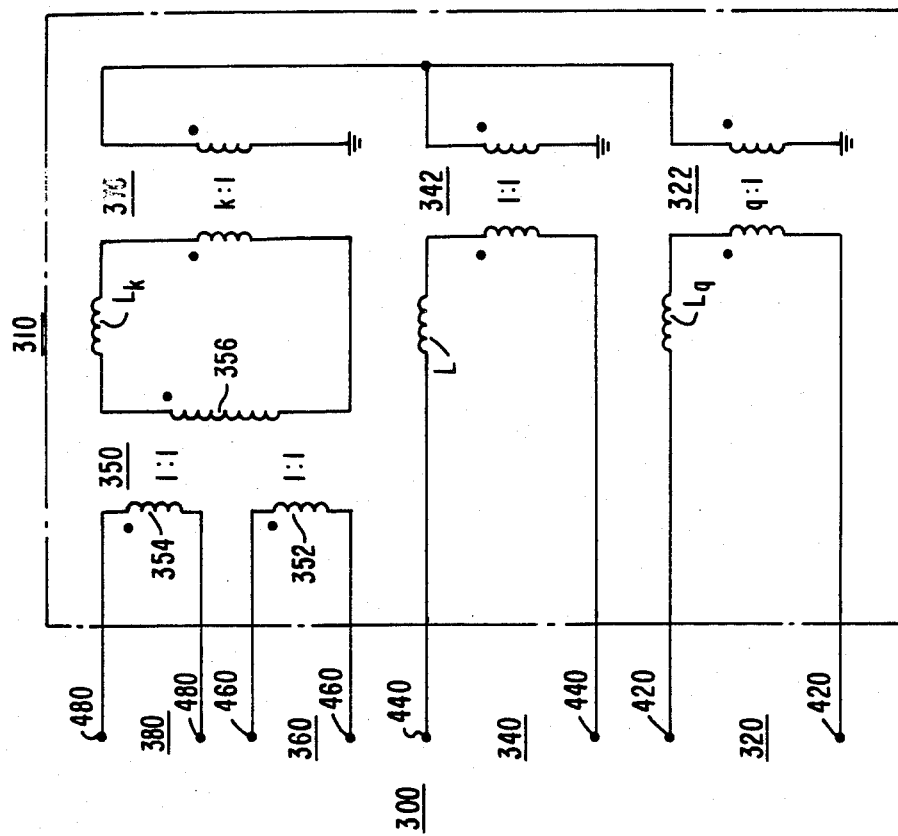
FIG. 4 is a schematic circuit of one phase of the three phase transformer of FIG. 2.

The coupling transformer of the present invention, although it would generally be realized as a three phase transformer, can be considered as three single phase transfomers for analytical purposes. Referring now to FIG. 4, an equivalent circuit 300 for the phase a transformer is shown. Similar circuits would apply to the transformers for phase b and c. The single phase transformer 310 has four windings that include the primary winding 320, the principal secondary winding 340, and two auxiliary secondary windings 360 and 380. In practice the two auxiliary secondary windings 360 and 380 are wound bifilar and for this reason are considered to be 100% coupled.

The transformer 310 has four pairs of terminals. Terminal pair 420 corresponds to primary winding 320; terminal pair 440 for principal secondary winding 340; terminal pairs 460 and 480 for the auxiliary secondary windings 360 and 380, respectively. The circuit elements within the dotted lines of FIG. 4 constitute the equivalent circuit for the phase a transformer. The equivalent circuit comprises four ideal transformers:

transformer 322 associated with primary winding 320 and having a turns ratio of q:1;

transformer 342 associated with principal secondary winding 340 and having a turns ratio of 1:1;

transformers 350 and 370 associated with the auxiliary secondary windings 360 and 380. For the ideal transformers 350 and 370, transformer 350 has three windings 352, 354, and 356, each having a 1:1 turns ratio between any pair of the three windings 352, 354, and 356. Transformer 370 has a turns ratio of k:1.

Inspection of the equivalent circuit shows that cancellation of ampere turns must hold between the four windings 320, 340, 360 and 380 of the transformer 310 as well as the required no load voltage ratios. The influence of the leakage reactance of the transformer 310 is represented by the inductances $L_q$, L, and $L_k$, where $L_q$=leakage reactance of the primary winding 320; L=leakage reactance of the principal secondary winding 340; and $L_k$=common leakage reactance of the auxiliary secondary windings 360 and 380. $L_k$ can also be considered as the leakage reactance of either of the bifilar wound auxiliary secondary windings. Because of the 100% coupling for bifilar windings, these descriptions for $L_k$ are interchangeable. If $L=2L_k$ or if there is no leakage reactance, then what occurs is the perfect cancellation of the harmonic currents of the series 5, 7, 17, 19, 29, 31 . . . n, p where:

n=5+z;
p=7+z; and
z=multiples of 12.

Because it is not possible to build a transformer having no leakage reactance, the transformer of the present invention should be constructed such that the leakage reactance $L=2L_k$ with a variation of about 10% high or low.

Figure 5:
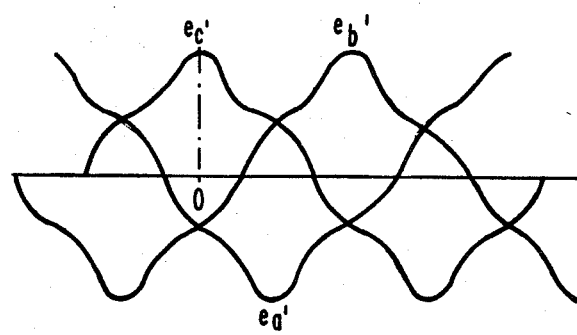
FIG. 5 is an illustration of the voltage wave forms of FIG. 3 including the influence of transformer leakage reactance.

For this case, FIG. 5 illustrates the effect of these leakage reactances upon the voltages in the stabilizer. This figure shows the voltage waveforms $e_a'$, $e_b'$ and $e_c'$ for the reactances 111, 113 and 115, respectively, of stabilizer 110; similar waveforms are produced for stabilizer 120. In FIG. 5 the fifth harmonic is shown added to the voltage waveforms for $e_a'$, $e_b'$ and $e_c'$. Inspection of these waveforms show the half wave symmetry, i.e., $e_a'(wt)=e_a'(-wt)$, which is present in the waveforms of FIG. 3. This assures that the current pulses produced in the stabilizers will be symmetrical and properly phased to yield currents into the coupling transformer which will be selectively cancelled. Addition of the remaining odd harmonics will result in a substantially more distorted voltage waveform but one which still exhibits half-wave symmetry. Thus, sine wave voltages are not required to obtain the desired harmonic cancellation.

Figure 6:
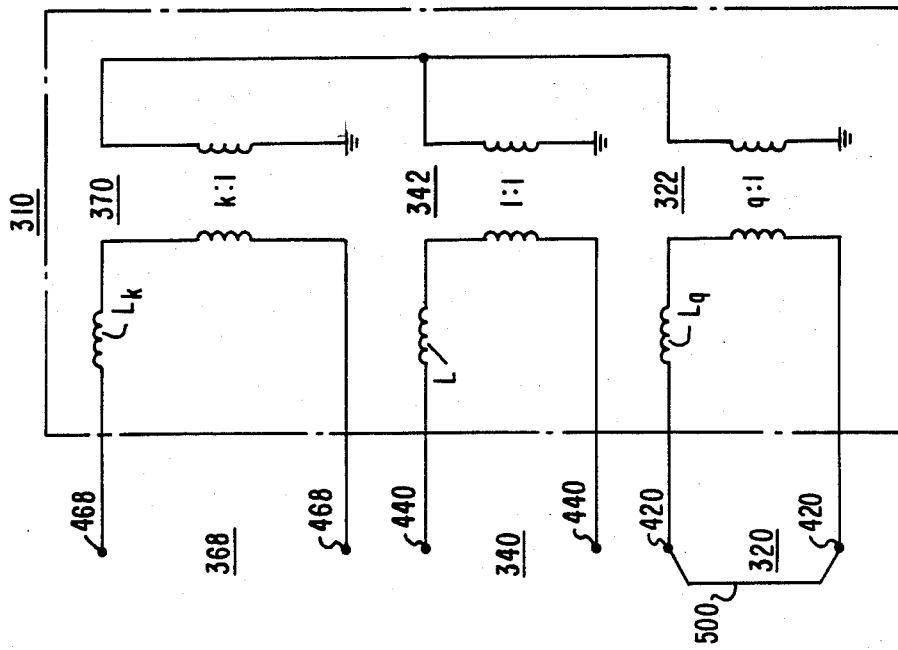
FIG. 6 is an equivalent circuit for the transformer shown in FIG. 4.

From the point of view of designing a transformer to meet the specific values for leakage reactances, one can think of the auxiliary secondary windings 360 and 380 as being a single winding in that these two windings are bifilar and can be considered to be 100% coupled for the purposes of analysis. Thus, we can really consider a three winding transformer rather than the four winding transformer shown in FIG. 4; such a transformer is illustrated within the dotted lines of FIG. 6. Elements which correspond to those shown in FIG. 4 are identified with corresponding numerals.

To implement the analysis, a short circuit 500 is placed across terminal pair 420 of the primary winding 320. The driving point and transfer inductances of the principal secondary winding 340 and the winding 368 which represent the two auxiliary secondary windings 360 and 380 of FIG. 4 can be expressed in terms of the leakage inductances $L_k$, L, nd $L_q$ as follows:

$$L_{11}=L_k+(k^2/q^2)L_q \qquad (1)$$

$$L_{21}=k\,L_q/q^2 \qquad (2)$$

$$L_{22}=L+L_q/q^2 \qquad (3)$$

$$L_{12}=k\,L_q/q^2 \qquad (4)$$

where:

$L_{11}$=self inductance seen looking into terminal pair 468 of the winding 368;

$L_{22}$=self inductance seen looking into terminal pair 440 of the principal secondary winding 340; and $L_{12}=L_{21}$=mutual inductance between winding 368 and principal secondary winding 340.

The permeance associated with each of the above inductive coefficients in Equations 1–4 is obtained by dividing the self inductance coefficients by the square of the number of turns of the winding involved and dividing mutual inductance coefficients by the product of the turns of the two coils involved (remember that for convenience the principal secondary winding is assumed to have only a single turn). Thus:

$$a_{11}=L_{11}/k^2 \qquad (5)$$

$$a_{12}=a_{21}=L_{21}/(k\times 1) \qquad (6)$$

$$a_{22}=L_{22}/(1\times 1) \qquad (7)$$

where:

$a_{11}$ = the permeance for winding 368;

$a_{22}$ = the permeance for principal secondary winding 340; and $a_{12}=a_{21}$ = the mutual permeance between winding 368 and principal secondary winding 340.

In terms of the leakage inductances the permeance coefficients become:

$$a_{11} = L_k/k^2 + L_q/q^2 \tag{8}$$

$$a_{12} = L_q/q^2 \tag{9}$$

$$a_{22} = L + L_q/q^2 \tag{10}$$

The reason for using permeances versus inductances is that it is easy to express the leakage, self and mutual permeances in terms of the transformer coil arrangement and dimensions.

Notice that $$a_{11} - a_{21} = L_k/k^2 \tag{11}$$

and $$a_{22} - a_{21} = L \tag{12}$$

but we would like $$L = 2L_k \tag{13}$$

As a result $$a_{22} - a_{21} = 2k^2(a_{11} - a_{21}). \tag{14}$$

Substituting $$k = (\sqrt{3} - 1)/2$$

into Equation 14, the desired relationship between the permeances becomes:

$$a_{22} - a_{21} = (2 - \sqrt{3})(a_{11} - a_{21}) \tag{15}$$

Rewriting Equation 15:

$$a_{11} = (2 + \sqrt{3})a_{22} - (1 + \sqrt{3})a_{21}. \tag{16}$$

A three phase transformer which realizes the relationship between the permeances given by Equation 16 can be constructed using either a shell form transformer or a core form transformer. A core form transformer which realizes this relationship is disclosed in the copending application referenced hereinbefore and is incorporated by reference herein.

The construction of a three phase coupling transformer having a one-to-one overall voltage transformation for selective harmonic cancellation of currents generated in a dual dynamic system is accomplished by:

forming the primary winding of the transformer for each electrical phase such that the turns ratio of the number of turns in the primary winding to the number of turns in the principal secondary winding is about $$\frac{3}{\sqrt{2}} \pm 0.1\%; \tag{17}$$

Winding the two auxiliary windings of each principal secondary winding in a substantially bifilar arrangement such that the turns ratio of the number of turns in the auxiliary secondary windings to the number of turns in the corresponding principal secondary winding is about $$\frac{\sqrt{3} - 1}{2} \pm 0.1\% \tag{18}$$

and such that the leakage reactance of the principal secondary winding is about twice ±10% the common leakage reactance of the two auxiliary secondary windings with both of these reactances being positive. For other overall voltages ratios Eq. (17) is modified to include a scaling factor. Further, the ratio between the primary and secondary sides is required to only achieve the desired voltage levels which are a function of the electrical network to which the transformer will be connected.

In another embodiment of the invention, capacitors can be installed in parallel with the primary windings. As shown by the dashed lines in FIG. 2, capacitors 182, 184 and 186 are electrically connected in parallel with the primary windings 142, 144 and 146, respectively. With this arrangement, the capacitors are in a delta configuration. A wye configuration is also possible with the ends of the wye being connected to the corners of the delta connected primary windings. The addition of the capacitors to the dynamic stabilizer creates an apparatus capable of delivering both lagging (inductive) currents and leading (capacitive) currents to the electrical network. This range of currents is created by controlling the conduction phase angle of the thyristors in the stabilizers 110 and 120. With a zero conduction angle, i.e., the thyristors fully off, the currents supplied to the network are leading. With the thyristors fully on, the currents are lagging. By reducing the conduction angle, the currents become less lagging. Eventually, the leading currents of the capacitors will balance the lagging currents of the reactances with further reduction in the conduction angle resulting in leading currents. The addition of the capacitors forms a simplified static VAR generator which has the benefit of having cancellation of the harmonic currents found in the series 5, 7, 17, 19 ... n, p where:

n = 5 + z
p = 7 + z and
z = multiples of twelve.

In conventional static VAR generators, harmonic currents are controlled by the use of capacitive filters which effect the dynamic performance thereof including restriction of bandwidth and instability, i.e., oscillation.

I claim:

1. An apparatus for the selective cancellation of harmonic frequencies of current of a multiphase dynamic stabilizer for a multiphase AC electrical network, comprising:

plurality of multiphase dynamic stabilizer means for providing electrical stabilization to the electrical network;

control means producing a control signal for controlling the operation of the stabilizer means on a periodic basis to produce the stabilization; and transformer means electrically interconnected intermediate the phases of the electrical network and the phases of each of the stabilizer means, the transformer means rotating the phases of the selected harmonic frequencies of currents produced in each of the stabilizer means with respect to those of the other stabilizer means such that the selected harmonic frequencies are substantially cancelled in each of the stabilizer means.

2. An apparatus for the selective cancellation of harmonic frequencies of current of a multiphase dynamic stabilizer for a multiphase AC electrical network, comprising:

plurality of multiphase dynamic stabilizer means for providing electrical stabilization to the electrical network;

control means producing a control signal for controlling the operation of the stabilizer means on a periodic basis to produce the stabilization; and transformer means having a multiturn primary side and a multiturn secondary side electrically interconnected intermediate the phases of the electrical network and the phases of each of the stabilizer means via the primary side and secondary side, respectively, the turns ratios and the leakage reactances of the primary and secondary sides means rotating the phases of the selected harmonic frequencies of currents produced in each of the stabilizer means with respect to those of the other stabilizer means by about 30 degrees such that the selected harmonic frequencies are substantially cancelled in each of the stabilizer means.

3. The apparatus as described in claim 1 wherein the transformer means, further comprises:

a plurality of multiturn primary windings comprising a primary side, the primary side being electrically connected to the electrical network with each primary winding cooperating with a single phase thereof;

a plurality of multiturn principal secondary windings forming a secondary side, the principal secondary windings being in corresponding phase relationship with the primary winding, one end of each principal secondary winding electrically connected in common;

a plurality of multiturn auxiliary secondary windings each having an electrical phase relationship, with the auxiliary secondary windings and principal secondary windings having corresponding phases being positioned adjacent each other in the secondary side with the auxiliary windings so positioned being substantially bifilar, an auxiliary winding electrically interconnected intermediate the free end of the principal secondary windings and each phase of each stabilizer means utilized such that all the electrical phases of the multiphase system are present in each electrically interconnected combination of principal secondary winding and auxiliary secondary windings with the phases of the stabilizer means so connected corresponding to the phase of the principal secondary winding, the auxiliary secondary windings rotating the electrical phases of the currents therein with respect to each other and the phases of the electric network whereby substantial cancellation of selected harmonic frequencies of the dynamic stabilizer means occurs with the selection of cancelled frequencies being dependent upon the number of dynamic stabilizer means connected.

4. The apparatus of claim 3 wherein the number of dynamic stabilizer means utilized is 2 and the multiphase AC electrical network has 3 electrical phases, one phase at each of the phase angles of about 0, about $+120°$ and about $-120°$.

5. The apparatus of claim 4 wherein each dynamic stabilizer means further comprises:

a plurality of reactance means, the reactance means being delta-connected and interconnected with the secondary side of the transformer means via the auxiliary secondary windings;

reactance control means for the reactance means having a pair of thyristors electrically connected in reverse parallel and in series with each reactance means, the reactance control means being responsive to the control signal by periodically varying the phase angle of conduction of the thyristors such that the reactance of the dynamic stabilizer varies thereby providing electrical stabilization, the periodic variance in the conduction angle of the thyristors producing harmonic frequencies of current in the dynamic stabilizer means having the orders 1, 5, 7, 11, 13 ... n where n is an odd integer not divisible by 3.

6. The apparatus of claim 5 wherein the transformer means further comprises:

the primary side having the plurality of primary windings connected in delta to the three electrical phases of the electrical network;

the secondary side having the plurality of principal secondary windings connected in a 3-legged wye configuration, one leg per electrical phase;

two auxiliary secondary windings per principal secondary winding and having the phase thereof, the free end of each principal secondary winding electrically connected to an end of one of the other two auxiliary secondary windings of the other two electrical phases with the free ends of each of the auxiliary secondary windings so connected being electrically connected to the phases of the first and the second dynamic stabilizer corresponding to the phase of the principal secondary winding electrically connected to the other ends thereof;

the electrically connected principal secondary winding and two auxiliary windings combinations producing two sets of three-phase currents which are displaced from each other by about 30 fundamental electrical degrees, the rotated three-phase currents resulting in the substantial cancellation of selected harmonic frequencies of current produced in the delta-connected dynamic stabilizer means.

7. The apparatus of claim 6 wherein for each electrical phase, the ratio of the number of turns in the auxiliary secondary windings to the number of turns in the principal secondary winding is in the range of about $$\frac{\sqrt{3}-1}{2} \pm 0.1\%;$$

and the value of leakage reactance of the principal secondary winding is about twice the value of the common leakage reactance of the two auxiliary secondary windings $\pm 10\%$ where both values of reactance are positive whereby the selectively cancelled harmonic frequencies of voltage and current are found in the series 5, 7, 17, 19 ... n, p where n=5+z; p=7+z; and z=multiples of 12.

8. The apparatus of claim 7 wherein a capacitor is electrically connected in parallel with each of the primary windings of the transformer means.

9. An apparatus for the selective cancellation of harmonic frequencies of current of a three-phase dynamic stabilizer for a three-phase AC electrical network, comprising:

first stabilizer means for dynamically compensating an electrical power system and having a plurality of variable reactance means connected in delta;

second stabilizer means for dynamically compensating the electrical power system and having a plurality of variable reactance means connected in delta;

each variable reactance means comprising a series combination of a pair of thyristors connected in reverse parallel and reactance, the phase angle of conduction of the thyristors determining the value of the reactance in the stabilizer means and producing harmonic currents of the orders 1, 5, 7, 11, 13 ... n, where n is an odd integer not divisible by 3;

transformer means for electrically interconnecting the first and second stabilizer means to the electrical network comprising:

a plurality of multiturn primary windings electrically connected in delta forming a primary side, the primary side being electrically connected to the electrical network with each primary winding cooperating with a single phase thereof;

a plurality of multiturn principal secondary windings electrically connected in wye forming a secondary side, the principal secondary windings being in corresponding phase relationship with the primary winding;

two multiturn bifilar auxiliary secondary windings per principal secondary winding and having the same phase thereof; the free end of each principal secondary winding electrically connected to an end of one of the other two auxiliary secondary windings of the other two principal secondary windings with the free ends of each of the auxiliary secondary windings so connected being electrically connected to the phase of the first and second stabilizers corresponding to the phase of the principal secondary winding electrically connected to the other ends thereof; the electrically connected combination of principal secondary winding and auxiliary windings being such that each phase is present therein; and the ratio of the number of turns of the bifilar auxiliary secondary windings to the peripheral secondary winding being about $$\frac{\sqrt{3}-1}{2} \pm 0.1\%,$$

with the leakage reactance of the principal secondary winding being equal to about twice the common leakage reactance of the bifilar auxiliary secondary windings ±10% whereby the leakage reactance of the secondary side rotates the phase of the harmonic currents produced in each stabilizer means by an amount of about 30 fundamental electrical degrees causing the substantial cancellation of the harmonic currents of each stabilizer characterized by the series 5, 7, 17, 19 ... n, p where n=5+z; p=7+z; and z=multiples of 12.

10. The apparatus of claim 9 wherein the variable reactance are chosen from the group consisting of inductors or reactors.

11. The apparatus of claim 9 wherein a capacitor is electrically connected in parallel with each of the primary windings of the transformer means.

12. A method for constructing a three-phase forked-wye transformer having a plurality of primary windings connected in delta and a plurality of principal secondary windings connected in wye with at least two auxiliary secondary windings attached to each free end of each principal secondary winding for the selective cancellation of harmonic currents of the series 1, 5, 7, 11, 13 ... n where n is an integer not divisible by 3 produced in at least two dynamic stabilizers electrically interconnected to a three phase AC electrical network via the transformer, each stabilizer including a plurality of delta connected thyristor controlled variable reactances comprising:

winding the auxiliary windings attached to each principal secondary winding in a substantially bifilar arrangement and such that the turns ratio of the number of turns in the auxiliary secondary windings to the number of turns in the attached principal secondary winding is about $$\frac{\sqrt{3}-1}{2} \pm 0.1\%$$

and the leakage reactance of the principal secondary winding is about twice ±10% the common leakage reactance of the attached auxiliary secondary windings whereby the transformers so constructed selectively cancels in each of the interconnected dynamic stabilizer the harmonics of current characterized by series 5, 7, 17, 19 ... n, p where n=5+z; p=7+z; and z=multiples of 12.

13. An apparatus for the selective cancellation of harmonic frequencies of current of a multiphase dynamic stabilizer for a multiphase AC electrical network, comprising:

plurality of multiphase dynamic stabilizer means for providing electrical stabilization to the electrical network;

control means producing a control signal for controlling the operation of the stabilizer means on a periodic basis to produce the stabilization; and transformer means electrically interconnected intermediate the phases of the electrical network and the phases of each of the stabilizer means for rotating the phases of the selected harmonic frequencies of currents produced in each of the stabilizer means with respect to those of the other stabilizer means such that the selected harmonic frequencies are substantially cancelled in each of the stabilizer means, comprising:

a plurality of multiturn primary windings comprising a primary side, the primary side being electrically connected to the electrical network with each primary winding cooperating with a single phase thereof;

a plurality of multiturn principal secondary windings forming a secondary side, the principal secondary windings being in corresponding phase relationship with the primary winding, one end of each principal secondary winding electrically connected in common;

a plurality of multiturn auxiliary secondary windings each having an electrical phase relationship, with the auxiliary secondary windings and principal secondary windings having corresponding phases being positioned adjacent each óther in the secondary side with the auxiliary windings so positioned being substantially bifilar, an auxiliary winding electrically interconnected intermediate the free end of the principal secondary windings and each phase of each stabilizer means utilized such that all the electrical phases of the multiphase system are present in each electrically interconnected combination of principal secondary winding and auxiliary secondary windings with the phases of the stabilizer means so connected corresponding to the phase of the principal secondary windings, the auxiliary secondary windings rotating the electrical phases of the currents therein with respect to each other and the phases of the electric network whereby substantial cancellation of selected harmonic frequencies of the dynamic stabilizer means occurs with the selection of cancelled frequencies being dependent upon the number of dynamic stabilizer means connected.

14. The apparatus of claim 13 wherein the number of dynamic stabilizer means utilized is 2 and the multiphase AC electrical network has 3 electrical phases, one phase at each of the phase angles of about 0, about $+120°$ and about $-120°$.

15. The apparatus of claim 14 wherein each dynamic stabilizer means further comprises:
   a plurality of reactance means, the reactance means being delta-connected and interconnected with the secondary side of the transformer means via the auxiliary secondary windings;
   reactance control means for the reactance means having a pair of thyristors electrically connected in reverse parallel and in series with each reactance means, the reactance control means being responsive to the control signal by periodically varying the phase angle of conduction of the thyristors such that the reactance of the dynamic stabilizer varies thereby providing electrical stabilization, the periodic variance in the conduction angle of the thyristors producing harmonic frequencies of current in the dynamic stabilizer means having the orders 1, 5, 7, 11, 13 ... n where n is an odd integer not divisible by 3.

16. The apparatus of claim 15 wherein the transformer means further comprises:
   the primary side having the plurality of primary windings connected in delta to the three electrical phases of the electrical network;
   the secondary side having the plurality of principal secondary windings connected in a 3-legged wye configuration, one leg per electrical phase;
   two auxiliary secondary windings per principal secondary winding and having the phase thereof, the free end of each principal secondary winding electrically connected to an end of one of the other two auxiliary secondary windings of the other two electrical phases with the free ends of each of the auxiliary secondary windings so connected being electrically connected to the phases of the first and the second dynamic stabilizer corresponding to the phase of the principal secondary winding electrically connected to the other ends thereof;
   the electrically connected principal secondary winding and two auxiliary windings combinations producing two sets of three-phase currents which are displaced from each other by about 30 fundamental electrical degrees, the rotated three-phase currents resulting in the substantial cancellation of selected harmonic frequencies of current produced in the delta-connected dynamic stabilizer means.

17. The apparatus of claim 16 wherein for each electrical phase, the ratio of the number of turns in the auxiliary secondary windings to the number of turns in the principal secondary winding is in the range of about $$\frac{\sqrt{3}-1}{2} = 0.1°;$$

and
   the value of leakage reactance of the principal secondary winding is about twice the value of the common leakage reactance of the two auxiliary secondary windings $\pm 10\%$ where both values of reactance are positive whereby the selectively cancelled harmonic frequencies of voltage and current are found in the series 5, 7, 17, 19 ... n, p where $n=5+z$; $p=5-z$; and $z=$ mutiples of 12.

18. The apparatus of claim 17 wherein a capacitor is electrically connected in parallel with each of the primary windings of the transformer means.

* * * * *